US012062342B2

(12) United States Patent
Jang et al.

(10) Patent No.: US 12,062,342 B2
(45) Date of Patent: Aug. 13, 2024

(54) POWER SUPPLY SYSTEM FOR DISPLAY APPARATUS

(71) Applicant: LX Semicon Co., Ltd., Daejeon (KR)

(72) Inventors: Won Suk Jang, Daejeon (KR); Tae Kyu Nam, Daegu (KR); Young Kook Ahn, Daejeon (KR); Chang Jin Jeong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/213,495

(22) Filed: Jun. 23, 2023

(65) Prior Publication Data

US 2024/0013736 A1 Jan. 11, 2024

(30) Foreign Application Priority Data

Jul. 5, 2022 (KR) ........................ 10-2022-0082776

(51) Int. Cl.
*G09G 3/34* (2006.01)

(52) U.S. Cl.
CPC ....... *G09G 3/3406* (2013.01); *G09G 2310/08* (2013.01); *G09G 2320/0626* (2013.01); *G09G 2330/028* (2013.01)

(58) Field of Classification Search
CPC ..... G09G 2330/02; G09G 3/3406; G09G 3/36
See application file for complete search history.

(56) References Cited

U.S. PATENT DOCUMENTS

| | | | | |
|---|---|---|---|---|
| 7,202,653 B2 | | 4/2007 | Pai | |
| 10,091,473 B1 | * | 10/2018 | Chen | G03B 21/006 |
| 11,111,720 B2 | * | 9/2021 | Peters | G02F 1/1323 |

FOREIGN PATENT DOCUMENTS

KR 10-0872467 B1 12/2008

* cited by examiner

*Primary Examiner* — Van N Chow
(74) *Attorney, Agent, or Firm* — POLSINELLI PC

(57) ABSTRACT

A power supply system for a display apparatus, in which a structure for supplying operating voltages for a display panel is improved, and the power supply system may improve power efficiency by generating operating voltages using a system voltage of a high level.

13 Claims, 5 Drawing Sheets

POWER SUPPLY SYSTEM FOR DISPLAY APPARATUS

CROSS-REFERENCE TO RELATED APPLICATION

This application claims the priority of Korean Patent Application No. 10-2022-0082776 filed on Jul. 5, 2022, which is hereby incorporated by reference in its entirety.

BACKGROUND

Field of the Disclosure

The present disclosure relates to a power supply system, and more particularly, to a power supply system for a display apparatus, in which a structure for supplying operating voltages for a display panel is improved.

Description of the Background

A notebook computer or a mobile device may be exemplified as a display apparatus for processing various information and displaying a result thereof on a display panel. When a screen is displayed using a liquid crystal display apparatus, the display apparatus may include a backlight module which is coupled to the display panel.

The display apparatus may be configured to use an adapter which converts AC power into DC power and supplies the converted DC power or a battery which provides DC power, as a system power source. The system power source is provided to a system board, and the system board may be configured to provide a system voltage and a power supply voltage to a control board. The display panel and the backlight module may be configured to receive necessary voltages through the control board.

A power management circuit is configured in the control board. The power management circuit may provide operating voltages for driving the display panel, by using the power supply voltage. A driving circuit is configured in the control board. The driving circuit may provide a backlight voltage for providing backlight, by using the system voltage.

In the above configuration, the system board should be configured to provide the system voltage and the power supply voltage to the control board through separate power lines and connectors. Accordingly, in the general display apparatus, the system board should be configured to provide two voltages, and the control board should be configured to receive two voltages. Therefore, a power supply system of the display apparatus may be configured such that a system for transferring voltages is complicated.

The power supply voltage is generated by buck-converting the system voltage to a low level. Therefore, parasitic resistance by the power line and the connector may greatly act on the power supply voltage, and current loss by the parasitic resistance may be caused relatively large, so that the power efficiency of the power supply system may decrease.

In particular, in a system requiring a high-resolution operation such as a gaming operation and a high-frequency operation, a load may act greatly, and a drop of a power supply voltage having a low level may occur greatly due to a load on a path which transfers the power supply voltage. As a result, the power efficiency of a power supply system may greatly decrease.

The power supply voltage generated by buck-converting the system voltage is transferred from the system board to the power management circuit of the control board. Therefore, since a decrease in efficiency by buck-converting is reflected on a decrease in efficiency of generating the operating voltages by the power management circuit of the control board, the overall power conversion efficiency of the power supply system may decrease.

The above information disclosed in this Background section is only for enhancement of understanding of the background of the described technology and therefore it may contain information that does not form prior art that is already known to a person of ordinary skill in the art.

SUMMARY

Accordingly, the present disclosure is directed to a power supply system for a display apparatus that substantially obviates one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a power supply system for a display apparatus, which receives a system voltage by a simple voltage transfer system and is capable of generating a backlight voltage and operating voltages using the system voltage.

The present disclosure is also to provide a power supply system for a display apparatus, which generates operating voltages using a system voltage of a high level to reduce the influence of a power line and a connector likely to act as parasitic resistance, thereby being capable of reducing voltage loss and improving power efficiency.

The present disclosure is also to provide a power supply system for a display apparatus, which generates operating voltages using a system voltage of a high level, thereby being capable of reducing influence according to an increase in a system load and improving power conversion efficiency.

Further, the present disclosure is to provide a power supply system for a display apparatus, in which a control board uses a system voltage of a system board as it is and generates operating voltages using the system voltage and an internal voltage generated by buck-converting in a power management circuit, thereby being capable of reducing power loss and improving power efficiency.

To achieve these and other advantages and in accordance with the present disclosure, as embodied and broadly described, a power supply system for a display apparatus includes a system board configured to use a system power source and provide a system voltage corresponding to the system power source; and a control board configured to generate a backlight voltage for backlight and operating voltages for display of a screen, by using the system voltage, and output the backlight voltage and the operating voltages.

In another aspect of the present disclosure, a power supply system for a display apparatus includes a driving circuit configured to receive a system voltage and boost the system voltage to provide a backlight voltage for backlight; and a power management circuit configured to receive the system voltage in parallel with the driving circuit, and generate operating voltages for display of a screen, by using the system voltage.

According to various aspects of the present disclosure, a system voltage may be transferred from a system board to a control board, and a backlight voltage and operating voltages may be generated using the system voltage. Therefore, according to the aspects of the present disclosure, since the system board and the control board may be configured to transfer only the system voltage, the numbers of required power lines and connectors may be reduced and a voltage transfer system may be simplified.

Also, according to various aspects of the present disclosure, the system voltage of a high level may be transferred from the system board to the control board without buck-converting, and the backlight voltage and the operating voltages may be generated using the transferred system voltage. Thus, according to the aspects of the present disclosure, advantages are provided in that current loss by parasitic resistance acting in a process in which the system voltage is transferred may be reduced and power efficiency may be improved. In particular, advantages are provided in that, even in the case of a system in which a load greatly acts, a voltage drop may be suppressed and power efficiency may be improved.

Further, according to the aspects of the present disclosure, the control board may generate the operating voltages by using the system voltage of the system board as it is without buck-converting. Hence, according to the aspects of the present disclosure, advantages are provided in that it is possible to prevent power efficiency from decreasing according to voltage conversion.

Moreover, according to the aspects of the present disclosure, advantages are provided in that, when a driving circuit for outputting the backlight voltage and a power management circuit for outputting the operating voltages are implemented in a single chip, since the backlight voltage and the operating voltages may be provided using only the system voltage, it is easy to design the chip, current consumption may be reduced and the power efficiency of a system power source may be improved.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

A display apparatus of the present disclosure may be implemented to use an adapter or a battery as a system power source, such as in a notebook computer or a mobile device, and to include a backlight module and a display panel to display a screen.

Figure 1:
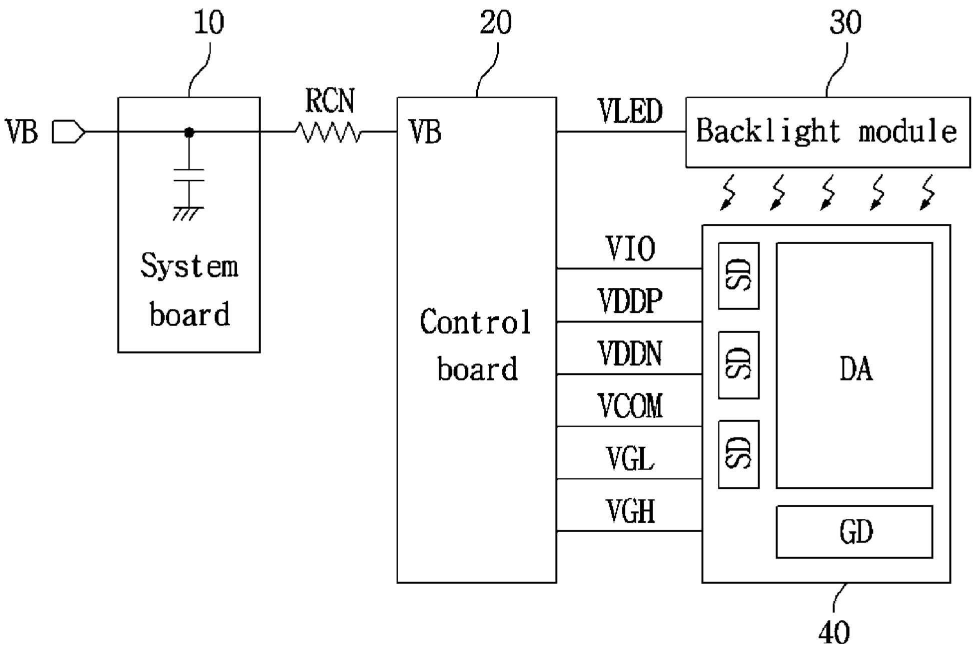
FIG. 1 is a block diagram illustrating an aspect of a power supply system of a display apparatus in accordance with the present disclosure.

In more detail, as illustrated in FIG. 1, the display apparatus may be implemented to include a system board 10, a control board 20, a backlight module 30 and a display panel 40.

An aspect of a power supply system for the display apparatus according to the present disclosure is improved in a structure which transfers power in the display apparatus. Therefore, drawings for explaining the aspect of the present disclosure exemplify a configuration for transferring power, and the illustration and description of parts and transmission lines for transmitting display data among respective components in the drawings are omitted.

In the aspect of the present disclosure, the system board 10 performs an internal operation using system power provided from an adapter or a battery.

In the case of a notebook computer or a mobile device, the system board 10 may be equipped with a processor (not illustrated) for calculation or data processing, may perform an internal operation related with calculation or data processing by the processor, and may provide display data for displaying an internal operation result through a data transmission line (not illustrated) to the control board 20.

The system board 10 may be configured to use a system voltage VB corresponding to system power, for the operation of the processor or the like, and may be configured to provide the system voltage VB to the control board 20 through a power line RCN. In FIG. 1, the power line RCN is illustrated as an equivalent resistor to mean that the power line RCN has a parasitic resistance component.

The control board 20 may receive the system voltage VB and display data (not illustrated) provided from the system board 10.

The control board 20 may control generation of a backlight voltage VLED for backlight and operating voltages for the display of a screen, by using the system voltage VB, and may output the backlight voltage VLED and the operating voltages.

The operating voltages generated by the control board 20 may include a core voltage VCORE, an input and output voltage VIO, driving voltages VDDP and VDDN, a common voltage VCOM, a gate high voltage VGH and a gate low voltage VGL, and the core voltage VCORE among the operating voltages described above may be understood as being used in the control board 20.

The control board 20 may control the level of the backlight voltage VLED in correspondence to the display data, and may provide the display data to the display panel 40. Detailed description for this will be made later with reference to FIG. 2. The backlight module 30 may be configured to provide backlight to the display panel 40 as light sources emit light by the backlight voltage VLED provided from the control board 20. The backlight module 30 may include light sources such as LED light sources (not illustrated)) which emit light by the backlight voltage VLED.

The display panel 40 is to display a screen by performing an optical shutter operation on backlight in each pixel.

To this end, in the display panel 40, a display area DA for forming a screen may be formed on a substrate, and pixels (not illustrated) which form columns and rows may be formed in the display area DA. For example, the pixels may be formed as thin film transistors.

The display panel 40 may include a source driver SD and a gate driver GD. The source driver SD is to drive source signals to the column lines, and the gate driver GD is to drive gate signals to the row lines.

The display area DA may display a screen as the source signals of the source driver SD and the gate signals of the gate driver GD are applied to the respective pixels through the column lines and the row lines.

In the display panel 40, for example, the source driver SD may receive the display data provided from the control board 20, and may output the source signals corresponding to the display data to the column lines of the display area DA. Also, for example, the gate driver GD may receive a gate control signal provided from the control board 20, and may output the gate signals to the row lines of the display area DA.

The source driver SD and the gate driver GD of the display panel 40 require operating voltages for operations, and the operating voltages for the operations of the source driver SD and the gate driver GD may be received from the control board 20. In more detail, the display panel 40 may receive operating voltages including the input and output voltage VIO, the driving voltages VDDP and VDDN and the common voltage VCOM for the operation of the source driver SD, and may receive the gate high voltage VGH and the gate low voltage VGL for the operation of the gate driver GD.

The generation and output of the backlight voltage VLED and operating voltages through using the system voltage VB by the control board 20 will be described below with reference to FIG. 2.

Figure 2:
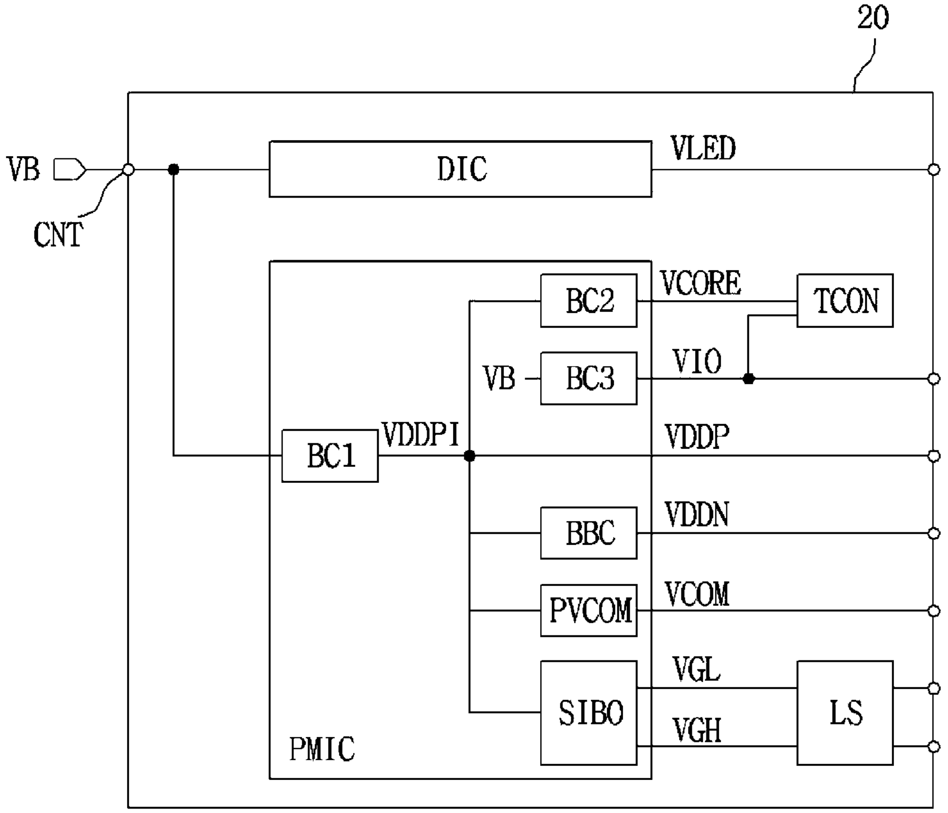
FIG. 2 is a block diagram illustrating an aspect of a control board of FIG. 1.

As illustrated in FIG. 2, the control board 20 may be exemplified as including a driving circuit DIC, a power management circuit PMIC, a timing controller TCON and a level shifter LS.

The control board 20 includes a connector CNT to which the system voltage VB is applied, and the driving circuit DIC and the power management circuit PMIC are connected in parallel to the connector CNT. That is to say, it may be understood that the driving circuit DIC and the power management circuit PMIC receive in parallel the system voltage VB which is transferred to the control board 20.

The driving circuit DIC may include a boost circuit or a buck-boost circuit, and may be configured to output the backlight voltage VLED by internally boosting the system voltage VB. Since the boost circuit or the buck-boost circuit which may be included in the driving circuit DIC may be designed using a known technique, detailed exemplification and description thereof will be omitted. For example, the backlight voltage VLED may be outputted to have maximum and minimum levels of a first range substantially the same as the system voltage VB by boosting.

The timing controller TCON may receive the display data provided from the system board 10, may obtain brightness information using the display data, and may control the driving circuit DIC using the brightness information to adjust the level of the backlight voltage VLED.

The timing controller TCON may configure the display data as a packet of a preset protocol, and may transmit the display data to the display panel 40 by providing the packet to the source driver SD. The timing controller TCON may generate a gate control signal in synchronization with the display data, and may provide the gate control signal to the gate driver GD. Illustration of wiring lines for signal transmission between the timing controller TCON, the source driver SD and the gate driver GD is omitted in FIGS. 1 and 2.

As described above, the power management circuit PMIC may receive the system voltage VB in parallel with the driving circuit DIC, and may generate operating voltages using the system voltage VB.

In more detail, the power management circuit PMIC may generate an internal voltage VDDPI having maximum and minimum levels of a second range by using the system voltage VB. The power management circuit PMIC may generate some operating voltages using the system voltage VB, and may generate the other operating voltages using the internal voltage VDDPI.

To this end, the power management circuit PMIC may include a buck converter BC1. The buck converter BC1 may generate the internal voltage VDDPI whose maximum and minimum levels have the second range lower than the first range, by buck-converting the system voltage VB having the maximum and minimum levels of the first range.

To generate the operating voltages, the power management circuit PMIC may include buck converters BC2 and BC3, a buck-boost converter BBC, a programmable converter PVCOM and a gate voltage converter SIBO.

By the above configuration, the power management circuit PMIC may generate the core voltage VCORE, the input and output voltage VIO, the driving voltages VDDP and VDDN, the common voltage VCOM, the gate high voltage VGH and the gate low voltage VGL as the operating voltages.

In more detail, the buck converter BC2 may generate the core voltage VCORE whose maximum and minimum levels have a fourth range lower than the second range, by buck-converting the internal voltage VDDPI, and the buck converter BC3 may generate the input and output voltage VIO whose maximum and minimum levels have a third range lower than the second range, by buck-converting the system voltage VB.

The power management circuit PMIC may be configured to output the core voltage VCORE of the buck converter BC2 and the input and output voltage VIO of the buck converter BC3 to the timing controller TCON.

By the above configuration, the timing controller TCON may use the core voltage VCORE to internally process the display data, and may use the input and output voltage VIO to drive buffers (not illustrated) for reception and transmission of data.

The core voltage VCORE may be designed to have a level lower than the input and output voltage VIO for low-voltage driving of the timing controller TCON. Therefore, the input and output voltage VIO may be generated such that the maximum and minimum levels have the third range higher than the fourth range of the core voltage VCORE.

Meanwhile, according to a fabricator's convenience, the buck converter BC2 may be configured to generate the core voltage VCORE whose maximum and minimum levels have the fourth range lower than the second range, by buck-converting the system voltage VB.

The power management circuit PMIC may provide the input and output voltage VIO to the source driver SD of the external display panel 40, and the source driver SD may use the input and output voltage VIO to receive the display data transmitted in the form of a packet.

Each of the buck converters BC1, BC2 and BC3 is to buck-convert an input voltage and output a voltage of a level lower than the input voltage, and may be designed to output a voltage corresponding to the input voltage according to an internal gain by a known technique. Thus, detailed exemplification and description thereof will be omitted.

The power management circuit PMIC may provide the driving voltages VDDP and VDDN and the common voltage VCOM required by the source driver SD, as operating voltages. The driving voltages VDDP and VDDN and the common voltage VCOM may be used as voltages for driving a buffer or the like inside the source driver SD.

The driving voltage VDDP may be outputted by using the internal voltage VDDPI outputted by the buck converter BC1 as it is.

The driving voltage VDDN may be generated by the buck-boost converter BBC. The buck-boost converter BBC may output the driving voltage VDDN which is generated by buck-boost converting the internal voltage VDDPI.

The driving voltages VDDP and VDDN may be generated to have maximum and minimum levels of the second range the same as the internal voltage VDDPI.

The common voltage VCOM may be generated by the programmable converter PVCOM. The programmable converter PVCOM may generate the common voltage VCOM which is generated by converting the internal voltage VDDPI by applying a gain corresponding to an option value selected among preset option values. The common voltage VCOM may be generated to have a medium level between the driving voltages VDDP and VDDN.

The power management circuit PMIC may generate and provide the gate high voltage VGH and the gate low voltage VGL required by the gate driver GD, as operating voltages. The gate high voltage VGH and the gate low voltage VGL may be provided to the gate driver GD to have levels adjusted through the level shifter LS, and the gate driver GD may generate a gate signal using the gate high voltage VGH and the gate low voltage VGL.

The gate voltage converter SIBO may be configured to generate the gate high voltage VGH and the gate low voltage VGL. The gate voltage converter SIBO may be configured to perform one of buck-boost converting and single inductor bipolar output converting. Therefore, by converting the internal voltage VDDPI using one of the buck-boost converting and the single inductor bipolar output converting, the gate voltage converter SIBO may output the gate high voltage VGH and the gate low voltage VGL. Since the buck-boost converting and the single inductor bipolar output converting may be implemented by a known technique, detailed exemplification and description thereof will be omitted.

The gate high voltage VGH may be outputted such that maximum and minimum levels correspond to a fifth range higher than the second range. The gate low voltage VGL may be outputted such that maximum and minimum levels correspond to a sixth range higher than the second range.

As in the above-described aspect of FIG. 2, the power management circuit PMIC may generate the operating voltages required in the timing controller TCON and the source driver SD and the gate driver GD of the display panel 40, by using the system voltage VB and the internal voltage VDDPI.

In the aspect of the present disclosure described above with reference to FIGS. 1 and 2, only the system voltage VB is transferred to the control board 20, and the control board 20 may generate the operating voltages using the system voltage VB.

Therefore, only a power line and a connector for transferring the system voltage VB are required between the system board 10 and the control board 20. Thus, a configuration and a system for transferring a voltage from the system board 10 to the control board 20 may be simplified.

In the aspect of the present disclosure, the operating voltages may be generated by using the system voltage VB used in the system board 10 as it is in the control board 20.

Hence, in the aspect of the present disclosure, the operating voltages may be generated by using the system voltage VB of a relatively high level to which efficiency loss according to power conversion in the system board 10 is not applied. Accordingly, in the aspect of the present disclosure, advantages are provided in that current loss by the action of parasitic resistance may be reduced and power efficiency may be improved. In particular, advantages are provided in that, even in the case of a system in which a large load acts, the aspect of the present disclosure may suppress a voltage drop and improve system efficiency by using the system voltage VB of a relatively high level.

In particular, in the aspect of the present disclosure, when the driving circuit DIC which outputs a backlight voltage VLED and the power management circuit PMIC which outputs operating voltages are implemented as one chip, since the backlight voltage VLED and the operating voltages may be provided using only a system voltage VB, current consumption may be reduced and the power efficiency of a system power source may be improved.

Figure 3:
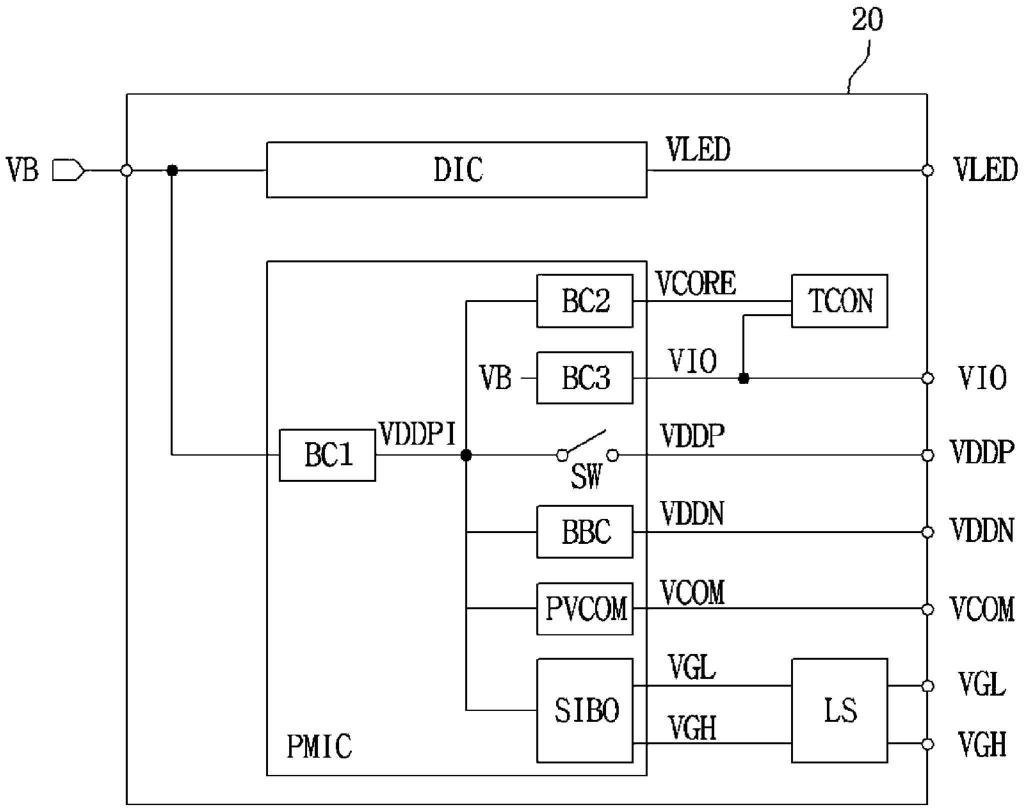
FIG. 3 is a waveform diagram illustrating a power sequence in FIG. 2.

By the aspect of the present disclosure having the above-described advantages, the operating voltages may be provided to have a power sequence as shown in FIG. 3.

In the case of FIG. 3, the input and output voltage VIO and the core voltage VCORE which are operating voltages generated by buck-converting the system voltage VB may be activated at preset timings. When the internal voltage VDDPI is activated by the system voltage VB, the driving voltage VDDP may be activated at the same time point as the internal voltage VDDPI. The internal voltage VDDPI may be activated at a timing earlier than the input and output voltage VIO and the core voltage VCORE.

The driving voltage VDDN, the gate high voltage VGH and the gate low voltage VGL which are generated by the internal voltage VDDPI may be activated in a preset order at timings later than the driving voltage VDDP.

FIG. 3 may be understood as an example for satisfying a sequence in which the driving voltage VDDP is activated earlier than the input and output voltage VIO.

Unlike this, a sequence in which the driving voltage VDDP is activated later than the input and output voltage VIO may be required. To this end, the present disclosure may be implemented as shown in FIG. 4.

Figure 4:
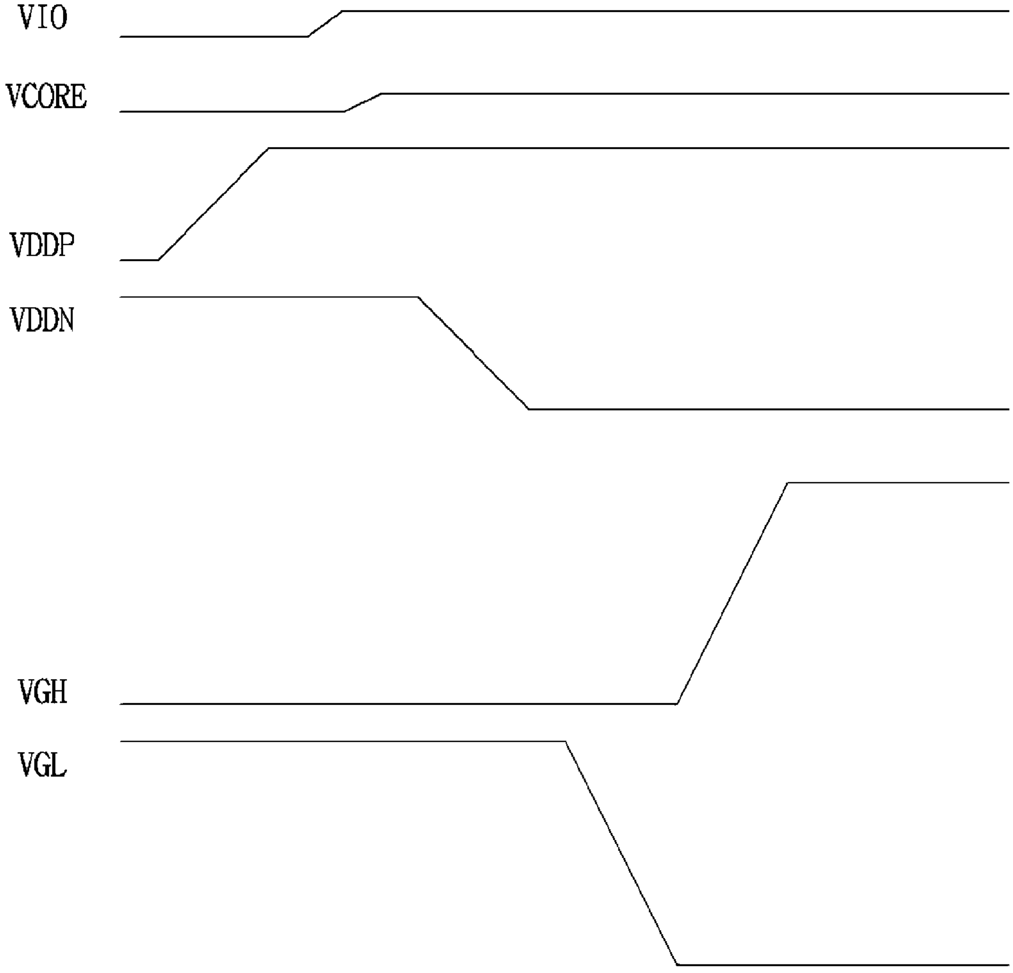
FIG. 4 is a block diagram illustrating another aspect of the control board of FIG. 1.

An aspect of FIG. 4 is not different from FIG. 2 except that a switch SW for outputting the internal voltage VDDPI as the driving voltage VDDP is added. Accordingly, since the configuration and operation of the aspect of FIG. 4 may be understood by referring to FIG. 2, repeated description therefor will be omitted.

The switch SW may output the internal voltage VDDPI as the driving voltage VDDP at a turn-on time point.

Figure 5:
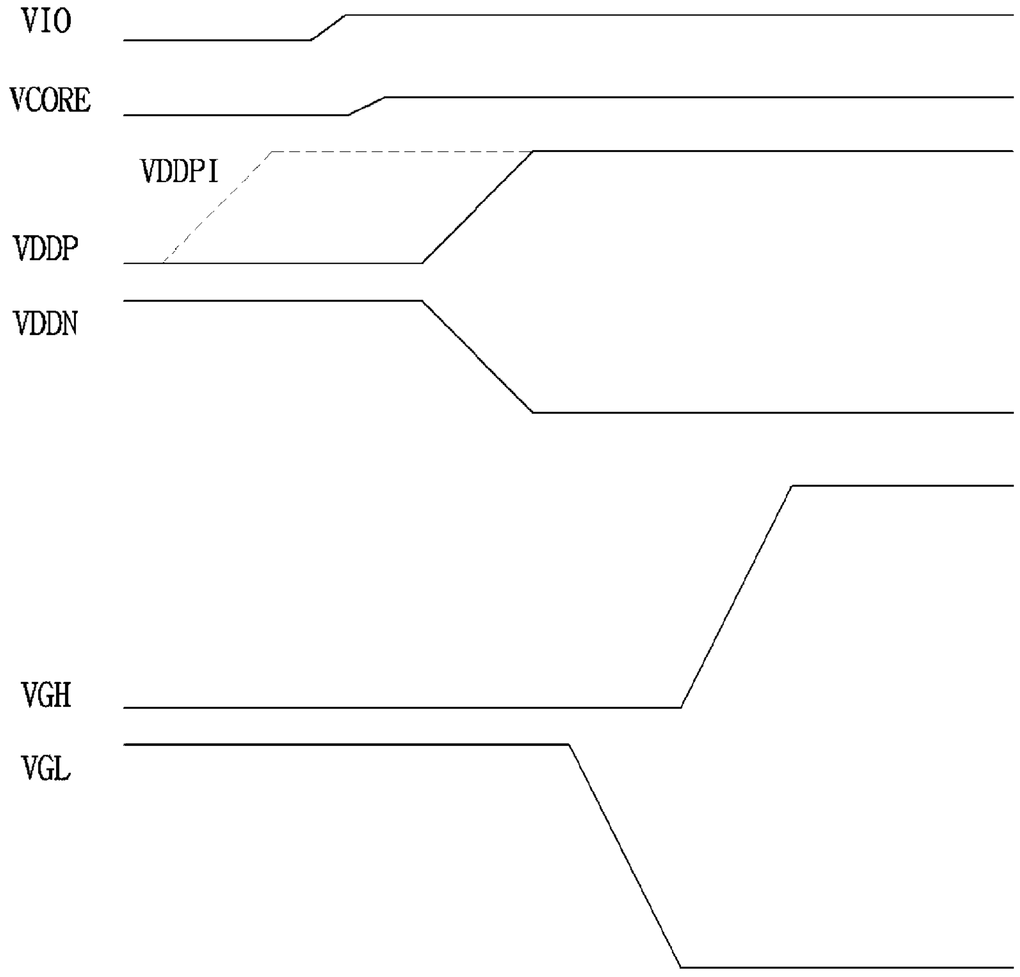
FIG. 5 is a waveform diagram illustrating a power sequence in FIG. 4.

By the aspect of FIG. 4, operating voltages may be provided to have a power sequence as shown in FIG. 5.

In other words, when a sequence in which the driving voltage VDDP is activated later than the input and output voltage VIO is required, the switch SW may be turned on after the input and output voltage VIO is activated.

The driving voltage VDDN, the gate high voltage VGH and the gate low voltage VGL which are generated by the internal voltage VDDPI may be activated in a preset order at timings the same as or later than the driving voltage VDDP.

As described above, the aspect of FIGS. 4 and 5 may satisfy the power sequence in which the driving voltage VDDP is activated after the input and output voltage VIO is activated.

Accordingly, FIGS. 4 and 5 provide an advantage in that a diversified power sequence may be satisfied.

It will be apparent to those skilled in the art that various modifications and variations can be made in the power supply system for the display apparatus of the present disclosure without departing from the spirit or scope of the aspects. Thus, it is intended that the present disclosure covers the modifications and variations of the aspects provided they come within the scope of the appended claims and their equivalents.

What is claimed is:

1. A power supply system for a display apparatus, comprising:

a system board configured to use a system power source and provide a system voltage corresponding to the system power source; and a control board configured to control generation of a backlight voltage for backlight and operating voltages for display of a screen, by using the system voltage, and output the backlight voltage and the operating voltages, wherein the control board comprises:

a driving circuit configured to generate the backlight voltage by boosting the system voltage; and a power management circuit configured to receive the system voltage in parallel with the driving circuit, and generate the operating voltages using the system voltage, wherein the power management circuit comprises a first buck converter which buck-converts the system voltage inputted at a level of a preset first range, to generate an internal voltage having a level of a second range whose maximum and minimum levels are lower than the first range, wherein the power management circuit uses the system voltage to generate some operating voltages, and wherein the power management circuit uses the internal voltage to generate other operating voltages.

2. The power supply system according to claim 1, wherein the power management circuit further comprises:

a second buck converter configured to buck-convert the system voltage to generate an input and output voltage having a level of a third range whose maximum and minimum levels are lower than the second range; and a third buck converter configured to buck-convert the internal voltage to generate a core voltage having a level of a fourth range whose maximum and minimum levels are lower than the second range, and wherein the power management circuit outputs the input and output voltage and the core voltage included in the operating voltages to a timing controller which transmits and receives data for the display.

3. The power supply system according to claim 2, wherein the power management circuit is configured to output the input and output voltage to the timing controller and a source driver of an external display panel which receives the data.

4. The power supply system according to claim 1, wherein the power management circuit further comprises:

a second buck converter configured to buck-convert the system voltage to generate an input and output voltage having a level of a third range whose maximum and minimum levels are lower than the second range; and a third buck converter configured to buck-convert the system voltage to generate a core voltage having a level of a fourth range whose maximum and minimum levels are lower than the second range, and wherein the power management circuit outputs the input and output voltage and the core voltage included in the operating voltages to a timing controller which transmits and receives data for the display.

5. The power supply system according to claim 1, wherein the power management circuit further comprises a buck-boost converter configured to buck-boost convert the internal voltage to generate a second driving voltage of the second range, wherein the power management circuit uses the internal voltage as a first driving voltage, and wherein the power management circuit outputs the first driving voltage and the second driving voltage included in the operating voltages to a source driver of an external display panel.

6. The power supply system according to claim 5, wherein the power management circuit further comprises a switch configured to switch output of the internal voltage as the first driving voltage, and wherein an output time point of the first driving voltage is determined by a turn-on time point of the switch.

7. The power supply system according to claim 1, wherein the power management circuit further comprises a gate voltage converter configured to convert the internal voltage using one of buck-boost converting and single inductor bipolar output converting, to generate a gate high voltage having a level of a fifth range whose maximum and minimum levels are higher than the second range and a gate low voltage having a level of a sixth range whose maximum and minimum levels are higher than the second range, and wherein the power management circuit outputs the gate high voltage and the gate low voltage included in the operating voltages.

8. A power supply system for a display apparatus, comprising:

a driving circuit configured to receive a system voltage and boost the system voltage to provide a backlight voltage for backlight; and a power management circuit configured to receive the system voltage in parallel with the driving circuit, and generate operating voltages for display of a screen, by using the system voltage, wherein the power management circuit comprises a first buck converter which buck-converts the system voltage inputted at a level of a preset first range, to generate an internal voltage having a level of a second range whose maximum and minimum levels are lower than the first range, wherein the power management circuit uses the system voltage to generate some operating voltages, and wherein the power management circuit uses the internal voltage to generate other operating voltages.

9. The power supply system according to claim 8, wherein the power management circuit further comprises:

a second buck converter configured to buck-convert the system voltage to generate an input and output voltage having a level of a third range whose maximum and minimum levels are lower than the second range; and a third buck converter configured to buck-convert the internal voltage to generate a core voltage having a level of a fourth range whose maximum and minimum levels are lower than the second range, and wherein the power management circuit outputs the input and output voltage and the core voltage included in the operating voltages to a timing controller which transmits and receives data for the display.

10. The power supply system according to claim 9, wherein the power management circuit is configured to output the input and output voltage to the timing controller and a source driver of an external display panel which receives the data.

11. The power supply system according to claim 8, wherein the power management circuit further comprises a buck-boost converter configured to buck-boost convert the internal voltage to generate a second driving voltage of the second range, wherein the power management circuit uses the internal voltage as a first driving voltage, and wherein the power management circuit outputs the first driving voltage and the second driving voltage included in the operating voltages to a source driver of an external display panel.

12. The power supply system according to claim 11, wherein the power management circuit further comprises a switch configured to switch output of the internal voltage as the first driving voltage, and wherein an output time point of the first driving voltage is determined by a turn-on time point of the switch.

13. The power supply system according to claim 8, wherein the power management circuit further comprises a gate voltage converter configured to convert the internal voltage using one of buck-boost converting and single inductor bipolar output converting, to generate a gate high voltage having a level of a fifth range whose maximum and minimum levels are higher than the second range and a gate low voltage having a level of a sixth range whose maximum and minimum levels are higher than the second range, and wherein the power management circuit outputs the gate high voltage and the gate low voltage included in the operating voltages.

* * * * *